United States Patent [19]
Nakano

[11] 3,909,714
[45] Sept. 30, 1975

[54] FREQUENCY MEASURING CIRCUIT

[75] Inventor: Yoshiaki Nakano, Gifu, Japan

[73] Assignee: Nippondenso Co., Ltd., Kariya, Japan

[22] Filed: Aug. 17, 1973

[21] Appl. No.: 389,157

[30] Foreign Application Priority Data
Aug. 23, 1972 Japan.............................. 47-84746

[52] U.S. Cl.............. 324/78 D; 324/79 D; 324/186; 324/188
[51] Int. Cl.²......................................... G01R 23/02
[58] Field of Search ....... 324/78 D, 79 D, 186, 188; 235/92 AE, 92 TF, 92 FQ, 92 ST

[56] References Cited
UNITED STATES PATENTS
| | | | |
|---|---|---|---|
| 2,831,162 | 4/1958 | Gross............................... | 324/78 D |
| 3,422,255 | 1/1969 | Malaby ........................... | 235/92 TF |

*Primary Examiner*—Alfred E. Smith
*Assistant Examiner*—Michael J. Tokar
*Attorney, Agent, or Firm*—Cushman, Darby & Cushman

[57] ABSTRACT

There is provided a frequency measuring circuit in which a plurality of counters having the same counting period are connected in parallel with an input terminal, and the time of beginning of counting by the counters is sequentially delayed a predetermined time from that of the preceeding counter, whereby when each counter completes its counting, a register sequentially stores the counted value in place of the previously stored one. In this way, even when the counting period of the individual counters is increased to obtain an improved measuring accuracy, the data interval between one data and the succeeding one can be reduced and thus the frequency measuring circuit of this invention operates with greatly improved response characteristic and accuracy.

3 Claims, 5 Drawing Figures

3,909,714

FREQUENCY MEASURING CIRCUIT

BACKGROUND OF THE INVENTION

1. Field of the Invention

The present invention relates to a digital frequency measuring circuit of improved response characteristic which is used in the detection of the running speed of a vehicle such as an automobile.

2. Description of the Prior Art

In known digital frequency measuring circuits of this type, a single counter is used to count for a predetermined time interval and the frequency is indicated in terms of the number of recurrent input pulses received during this measuring time interval. Therefore, it is necessary to increase the measuring time interval to improve the accuracy of the frequency measurement. In this case, there is a disadvantage in that in contrast to analog type frequency measurements, the data obtained are discrete and therefore the time interval between one data and the succeeding data increases in proportion to an increase in the measuring time interval and the response characteristic is also insufficient.

SUMMARY OF THE INVENTION

With a view to overcoming the foregoing difficulty, it is an object of the present invention to provide a frequency measuring circuit in which a plurality of counters each receiving recurrent input pulses and having the same counting period are connected in parallel and the time of beginning of the counting action of the counters is sequentially delayed a predetermined time from that of the preceding counter, whereby the output count of each counter is stored in an output register upon completion of its counting action, thereby reducing the data interval and improving the response characteristic of the circuit.

Thus, since, in the circuit according to the present invention, a plurality of counters each receiving recurrent input pulses and having the same counting time are connected in parallel and the time of beginning of the counting action of the counters is sequentially delayed a predetermined time from that of the preceding counter so that the output of each counter is stored in an output register upon completion of its counting action, as compared with conventional frequency measuring circuits of this type, there is a remarkable advantage in that the data interval at the termination of the counting actions of the two succeeding counters can be reduced and at the same time the measuring time interval can be increased, thereby greatly improving the response characteristic and the measurement accuracy.

DESCRIPTION OF THE PREFERRED EMBODIMENT

The present invention will now be explained in greater detail with reference to the illustrated embodiment.

Figure 1:
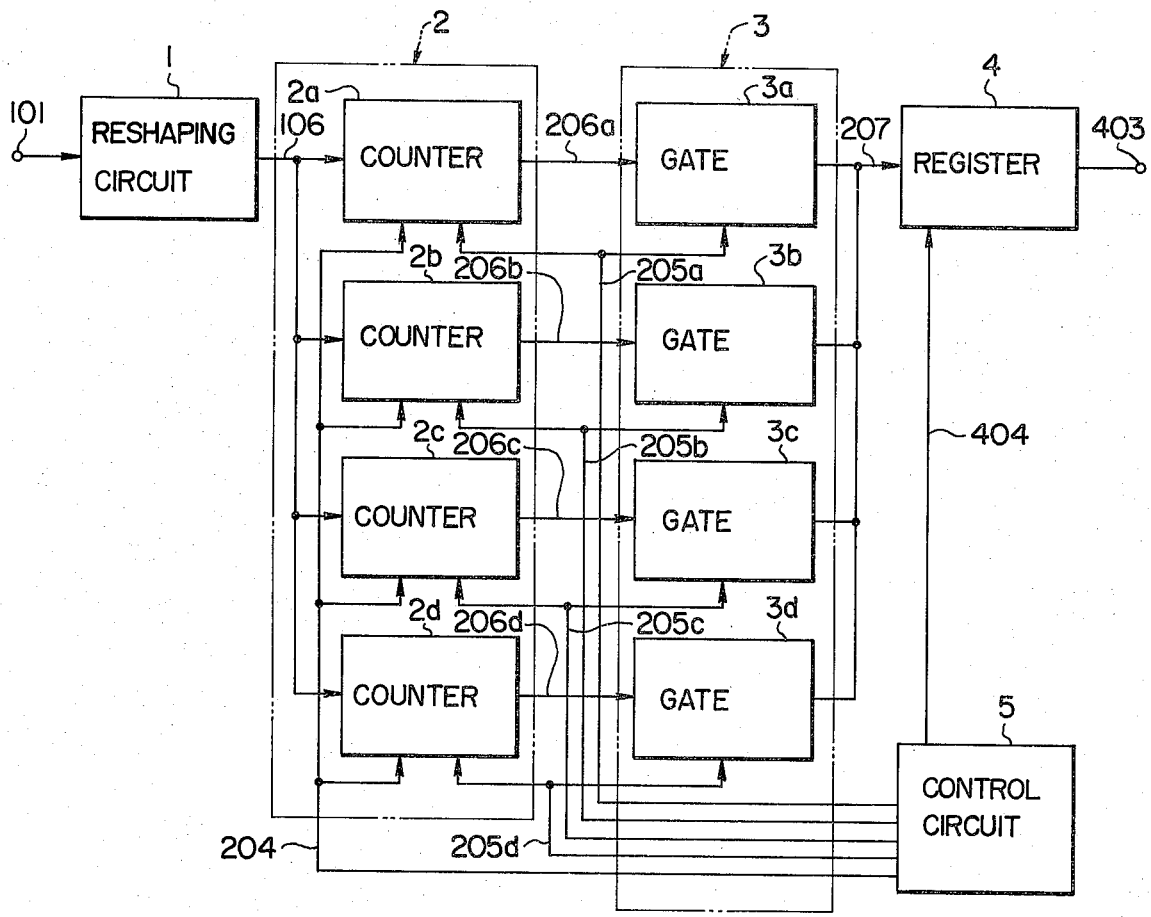
FIG. 1 is a block diagram showing the embodiment of a frequency measuring circuit according to the present invention.
Figure 2:
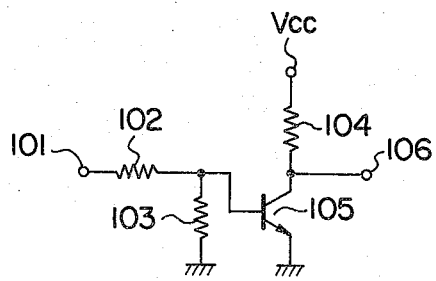
FIG. 2 is an electric wiring diagram showing an embodiment of the reshaping circuit used in the circuit shown in FIG. 1.
Figure 3:
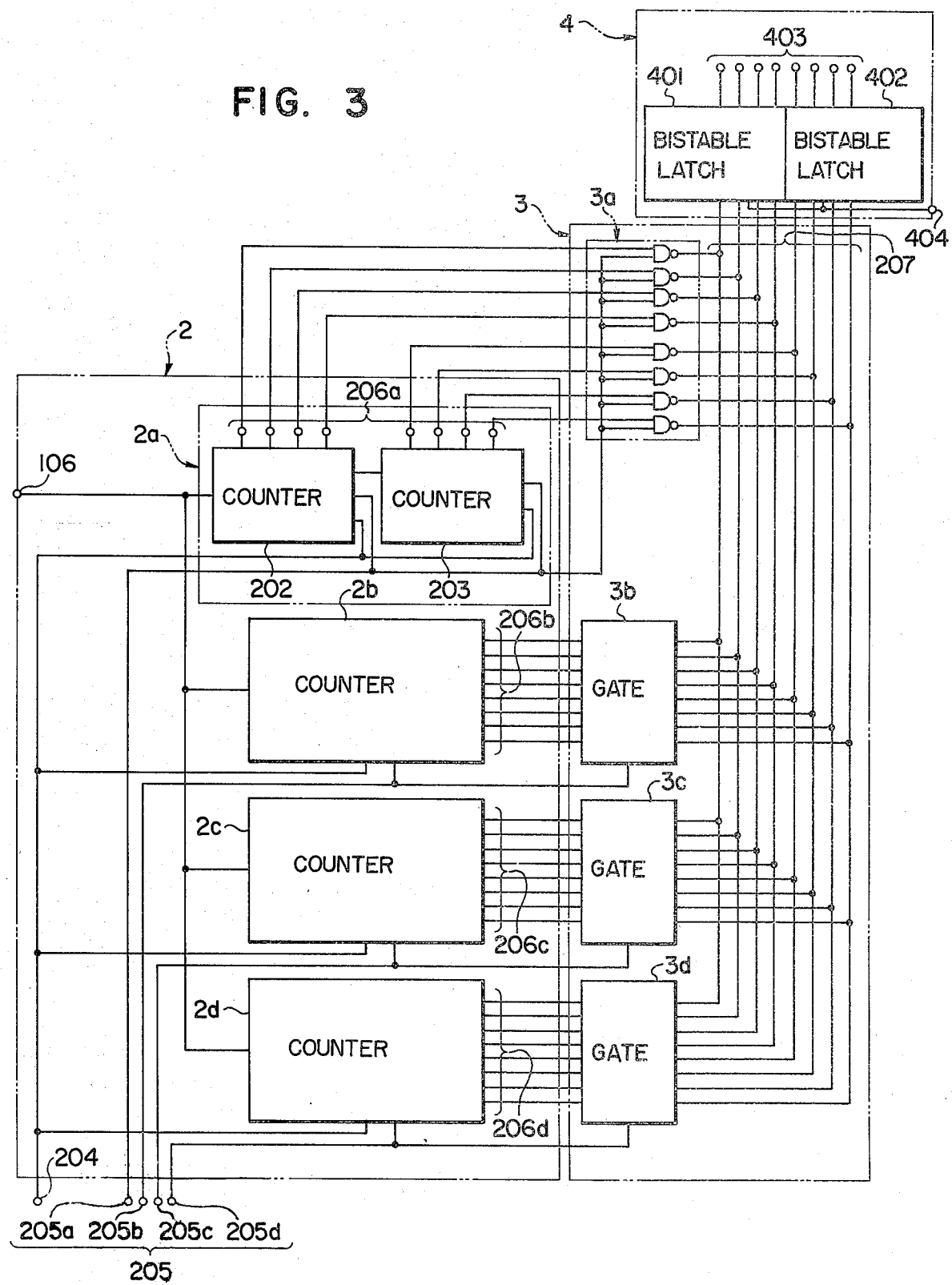
FIG. 3 is an electric wiring diagram showing an embodiment of the counter circuit, the gating circuit and the output register used in the circuit shown in FIG. 1.

Referring first to FIG. 1 illustrating a block diagram for an embodiment of a frequency measuring circuit according to the present invention, numeral 1 designates a reshaping circuit for converting an input signal into a recurrent pulse waveform for frequency measurement. An exemplary circuit diagram of a reshaping circuit 1 is shown in FIG. 2 in which numeral 101 designates an input terminal to which a recurrent signal is applied, 102, 103 and 104 resistors, 105 a transistor, 106 an output terminal. In operation, the input signal applied to the input terminal 101 is divided by the resistors 102 and 103 and then applied to the base of the transistor 105 and a power supply voltage of +5 V is applied to a power supply terminal $V_{CC}$ connected to the collector resistor 104. In this way, the voltage of the output signal generated at the output terminal 106 has values corresponding to the signal levels of the digital integrated circuits in the succeeding stages. Consequently, the input signal is converted into a reshaped signal of pulse waveform whose low level is 0V and the high level is 5V. Numeral 2 designates a counter circuit for counting the number of reshaped signal pulses and it comprises four counters 2a, 2b, 2c and 2d each thereof producing an 8-bit binary code output. Numeral 3 designates a gating circuit for transmitting, upon completion of each counting action, the 8-bit binary code output count of the counter circuit 2 to the' succeeding stage in the form of 8-bit binary code and it comprises four gates 3a, 3b, 3c and 3d. Numeral 4 designates an output register for storing the output of the gating circuit 3, that is, the count of each of the counters 2a, 2b, 2c and 2d is sequentially stored upon completion of the counting action thereof. In this case, it is sufficient if the counters 2a, 2b, 2c and 2d in the counter circuit 2 are of the same plural number as the gates 3a, 3b, 3c and 3d in the gating circuit 3. An exemplary circuit diagram of the gating circuit 3, the counter circuit 2 and the output register 4 is shown in FIG. 3 and the reshaped signals at the output terminal 106 of the reshaping circuit 1 in FIG. 2 are applied to the input terminal 106. Numerals 202 and 203 designate series connected integrated circuit 4-bit binary counters manufactured and sold by Texas Instrument Inc. of U.S.A. (hereinafter referred to as "TI") as the CIRCUIT NO. SN 7493 and the two 4-bit counters 202 and 203 form the 8-bit binary counter 2a. The counters 2b, 2c and 2d are identical in construction with the counter 2a. Numeral 204 designates a reset terminal for receiving reset signals and numeral 205 designates a decoder terminal comprising four terminals 205a, 205b, 205c and 205d to which decoder signals are applied whereby when the reset terminal 204 and the terminal 205a are both at a high level, the counters 202 and 203 are reset to clear the contents thereof. The other counters 2b, 2c and 2d are similar in operation with the counter 2a. Numerals 206a, 206b, 206c and 206d designate the output terminals of the counters 2a, 2b, 2c and 2d where an 8-bit count is generated. The gate 3a which receives this 8-bit count may for example comprise two integrated circuits, i.e., CIRCUIT NO. SN 15846 manufactured and sold by TI and comprising light two-input NAND gates which can be wired-OR and whose one input terminals are connected to the output terminal 206a of the counter 2a and the other input terminals are connected to the terminal 205a for the counter 2a. The output terminals of the NAND gates in the gate 3a are connected respectively with the corresponding output terminals of the gates 3b, 3c and 3d in wired-OR connection to supply signals to an output terminal 207. An output register 4 which receives the 8 -bit signals at the wired-OR output terminal 207 comprises two 4-bit bistable latches 401 and 402 such as CIRCUIT NO. 7475 manufactured and sold by TI, and numeral 404 designates a common gating terminal for the bistable latches 401 and 402 so that when the common gating terminal 404 changes to the high level, the previously stored count is replaced and then the current input signal is stored and generated at an output terminal 403.

Figure 4:
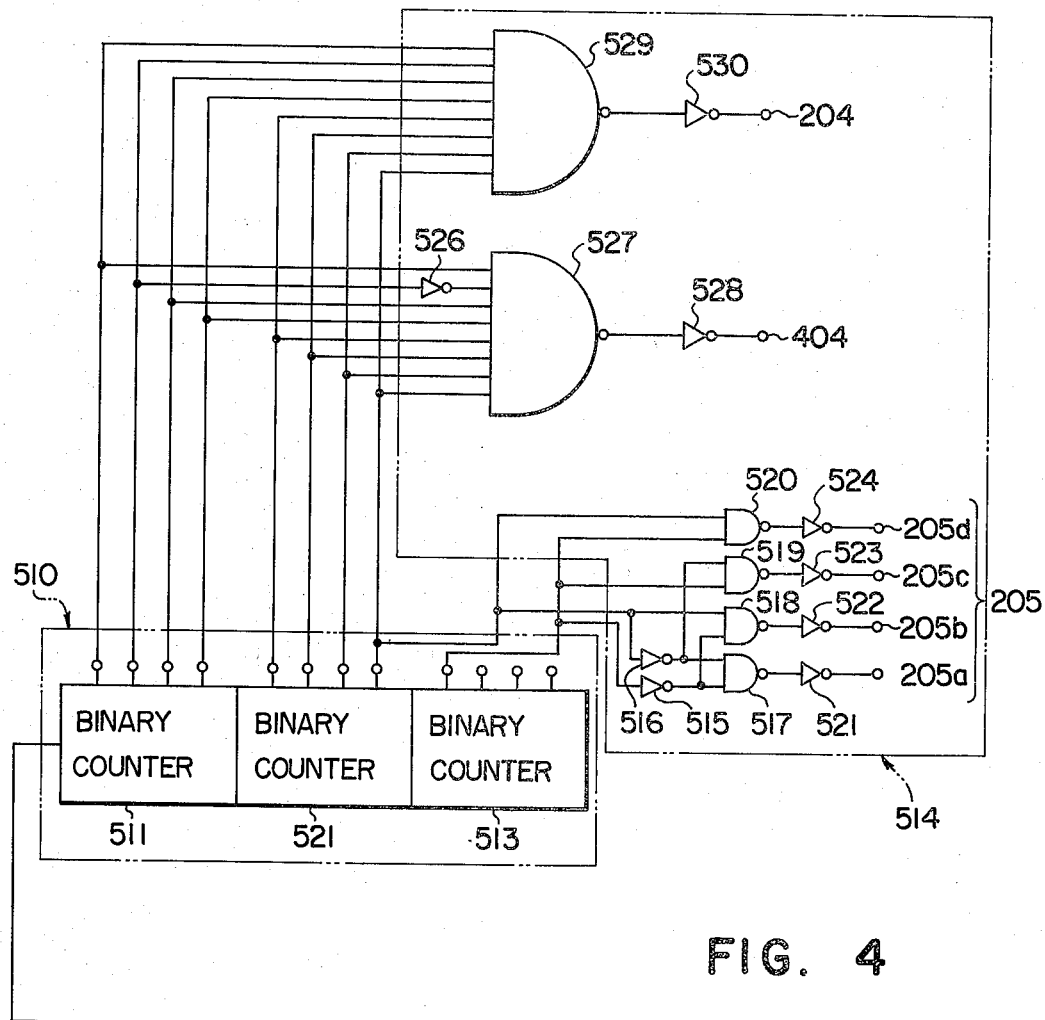
FIG. 4 is an electric wiring diagram showing an embodiment of the control circuit in the circuit shown in FIG. 1.
Figure 4:
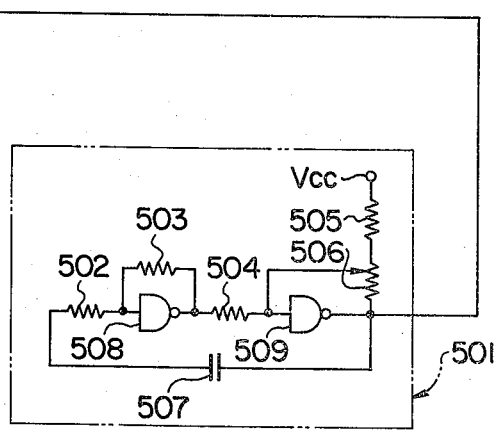

Numeral 5 designates a control circuit for controlling the timing of the signals applied to the counter circuit 2, the reset terminal 204 of the counter circuit 2 and the decoder terminal 205 and the signals applied to the common gating terminal 404 of the output register 4. An exemplary circuit diagram of the control circuit 5 is illustrated in FIG. 4 wherein numeral 501 designates a reference oscillator whose oscillation frequency is for example 10 KHz and which comprises five resistors 502, 503, 504, 505 and 506, a capacitor 507 and two NAND gates 508 and 509 with the power supply voltage being applied to the power supply terminal $V_{cc}$. Numeral 510 designates a 9-bit binary counter comprising three binary counters 511, 512 and 513 which are of the identical construction as the previously mentioned 4-bit binary counter 202 and the terminal for three bits are left open. Numeral 514 designates a decoder comprising two inverters 515 and 516, four two-input NAND gates 517, 518, 519 and 520 and four inverters 521, 522, 523 and 524, whereby the eighth-bit and ninth-bit signals of the 9-bit binary counter 510 are received as its input signals to produce the 0th to 3rd decoder signals at the terminals 205a, 205b, 205c and 205d, that is, the decoder signals are applied to the terminals 205a, 205b, 205c and 205d of the decoder terminal 205 shown in FIG. 3. On the other hand, using the 8-bit signals of the 9-bit binary counter 510, the 253rd signal of this binary counter 510 is decoded by an inverter 526, a NAND gate 527 and an inverter 528 to produce an output gating signal at an output terminal 404 and similarly the 255th signal of the binary counter 510 is decoded by a NAND gate 529 and an inverter 530 to produce a counter reset signal at an output terminal 204. Namely, the output gating signal is applied to the common gating terminal 404 shown in FIG. 3, while the counter reset signal is applied to the reset terminal 204 shown in FIG. 3.

Figure 5:
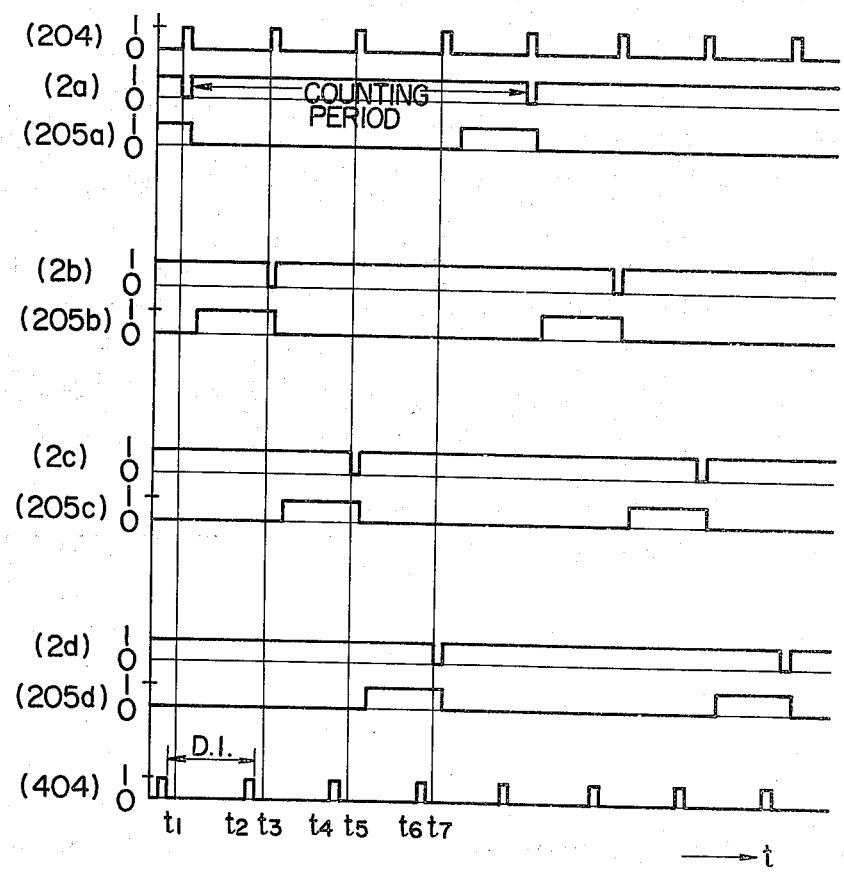
FIG. 5 is a timing chart useful for explaining the operation of the circuit shown in FIG. 1.

With the construction described above, the operation of the circuit according to the present invention will now be explained. In FIG. 5 showing a timing chart useful for explaining the operation of the circuit, (204) indicates the counter reset signal generated at an output of the inverter 530 of the control circuit 5 and applied to the reset terminal 204, (2a), (2b), (2c) and (2d) time-charts showing the counting time of the counters 2a, 2b, 2c and 2d, (205a), (205b), (205c) and (205d) the decoder signals generated at the output terminals 205a, 205b, 205c and 205d of the control circuit 5 and applied to the terminals 205a, 205b, 205c and 205d of the decoder terminal 205, (404) the output gating signal generated at the output terminal 404 of the control circuit 5 and applied to the common gating terminal 404.

At a time $t_1$, the decoder signal shown in FIG. 5 (205a) and the counter reset signal shown in FIG. 5 (204) are both at the high level so that the counter 2a is reset to clear its count and thereby to cause it to start counting again. Then, as the time passes from the time $t_1$ to a time $t_2$ at which the data interval (D.I.) expires, the output gating signal shown in FIG. 5 (404) changes to the high level with the result that the output register 4 comes into operation and stores the count of the counter 2b transmitted thereto through the gate 3b, thereby replacing the previously stored count. Immediately thereafter, i.e., at a time $t_3$, the counter reset signal shown in FIG. 5 (204) and the decoder signal shown in FIG. 5 (205b) are both at the high level so that the counter 2b is reset to clear its count and thereby to start counting again. This process of operation is repeated so that at a time $t_4$, the output register 4 stores the count of the counter 2c in place of the previously stored count. At a time $t_5$, the counter 2c is reset and at a time $t_6$, the output register 4 stores the count of the counter 2d which is reset at a time $t_7$. The series of these operations which constitute one cycle are repeated with the result that the four counters 2a, 2b, 2c and 2d continuously sequentially perform their counting actions, with the time of beginning of the counting action being delayed from that of the preceeding counter by one fourth of the counting time. Accordingly, even when the counting time is increased to improve the accuracy of measurement, the data interval can be reduced by increasing the number of counters and at the same time the same input signal pulses are simultaneously counted by two or more counters to ensure an integrator action and hence a smoothing action when a noise signal is included in an input signal.

I claim:

1. A frequency measuring circuit comprising an input terminal, a plurality of counters each having an input connected in parallel to said input terminal for simultaneously receiving the same portions of a train of pulses to be counted and an output terminal and each having the same counting period, register means connected to the output terminals of each of said counters to store, upon receipt of a storage signal, the count thereof, and circuit means connected to said counters for sequentially delaying the beginning of the counting of each of said counters a predetermined time beyond the beginning of counting of the preceding counter and connected to said register means for producing said storage signal to cause storage in said register of the count of each of said counters upon completion of the counting thereof at the end of said counting period.

2. A frequency measuring circuit according to claim 1, wherein said register means includes gate means connected between each of said counters and said register means.

3. A frequency measuring circuit according to claim 2, wherein said circuit means comprises a reference signal generator, a dividing counter connected to said reference signal generator to divide the frequency of the reference signal therefrom, and a decoder connected to said frequency dividing counter to generate control signals including said storage signal.

* * * * *